Jan. 19, 1937.  E. F. HULBERT  2,068,136
PROCESS OF PREPARING EMULSIONS
Filed Aug. 20, 1934  2 Sheets-Sheet 1
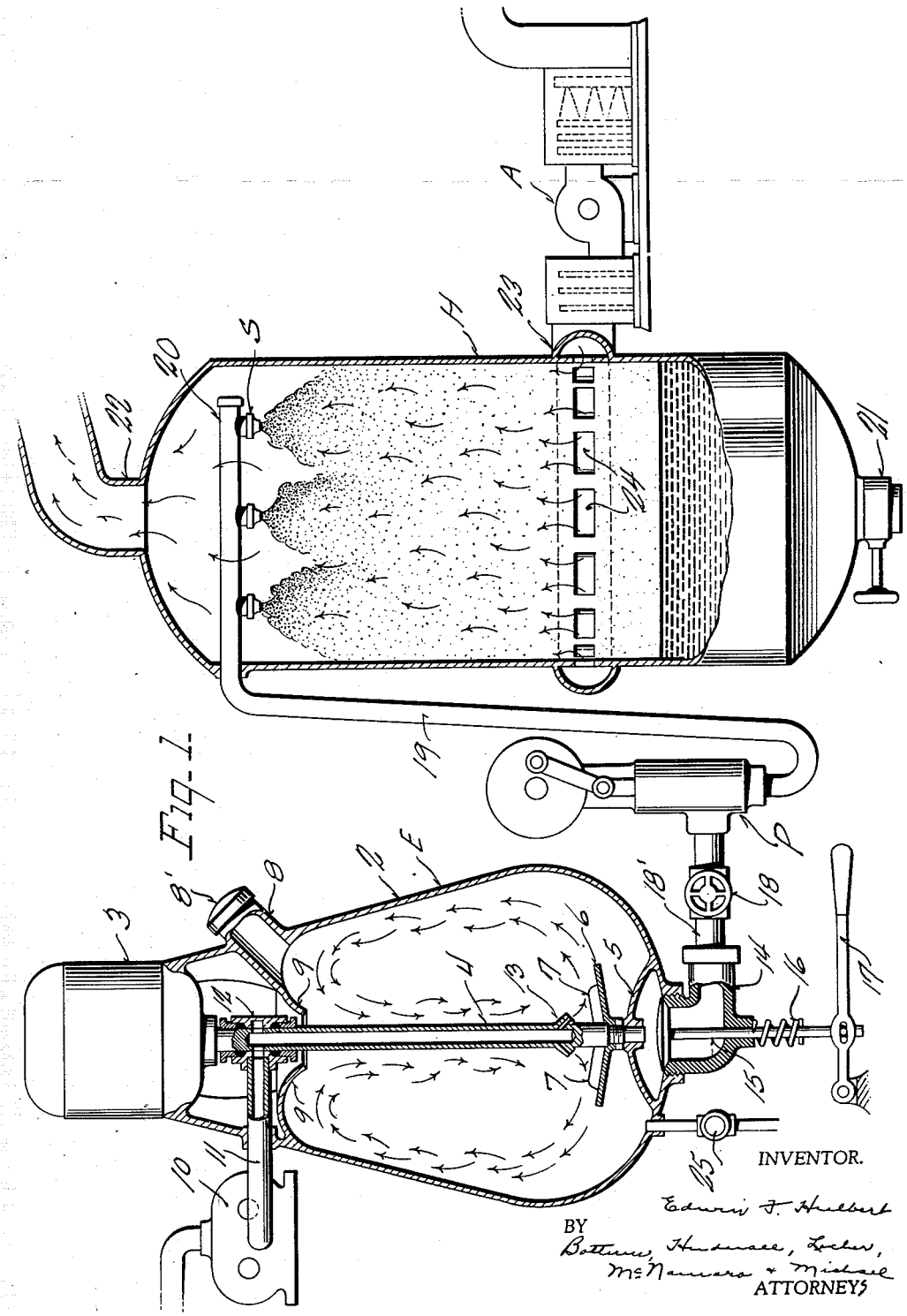
INVENTOR.
Edwin F. Hulbert
BY
Bottum, Hunsdale, Locke,
McNamara & Michael
ATTORNEYS Jan. 19, 1937. E. F. HULBERT 2,068,136
PROCESS OF PREPARING EMULSIONS
Filed Aug. 20, 1934 2 Sheets-Sheet 2
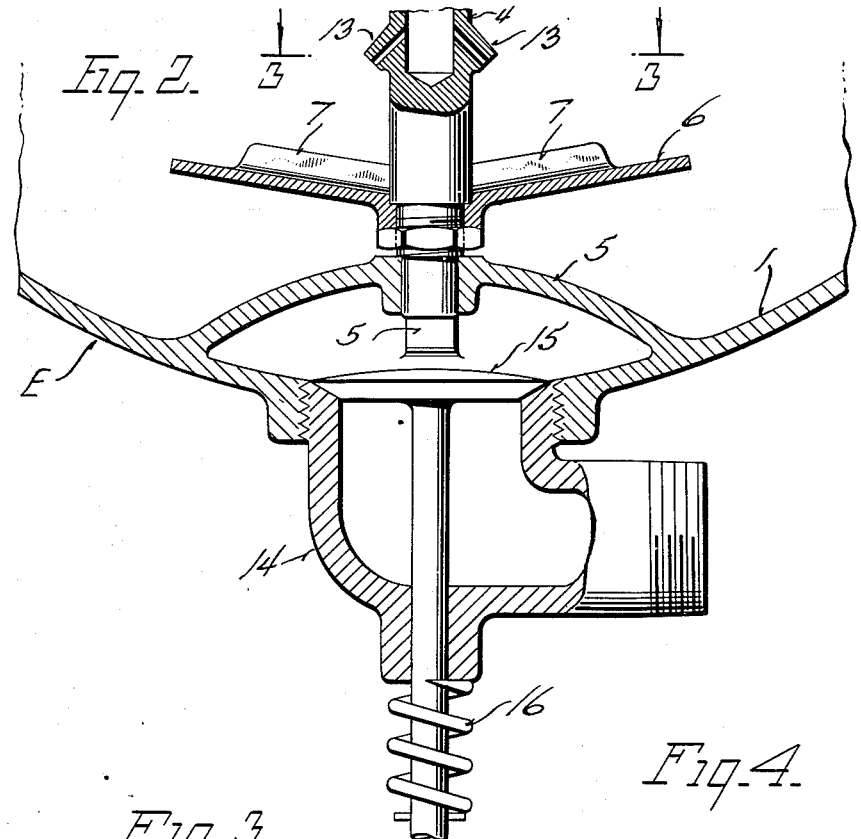
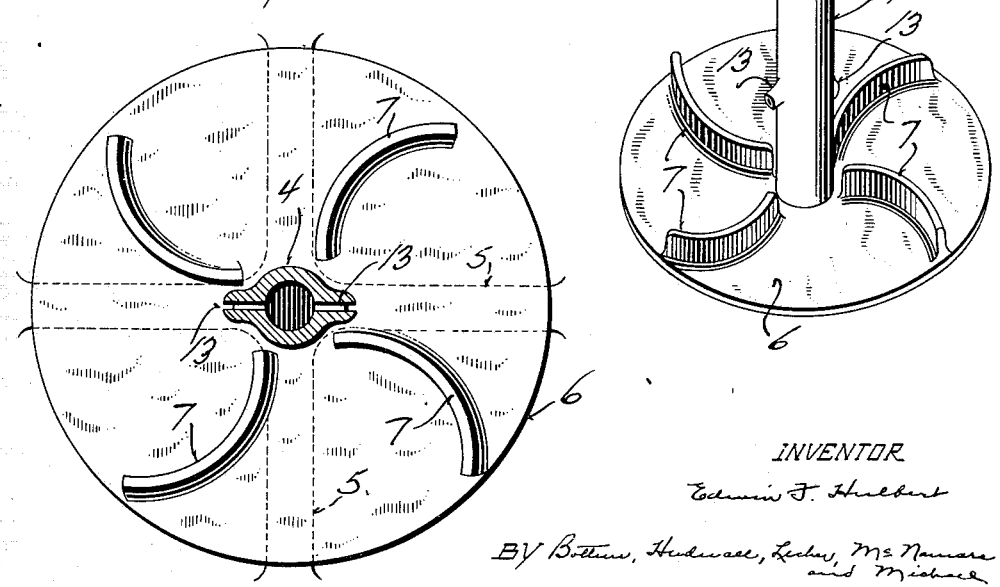
INVENTOR
Edwin F. Hulbert
BY Bottum, Hudnall, Lecher, McNamara and Michael
ATTORNEYS Patented Jan. 19, 1937

2,068,136

UNITED STATES PATENT OFFICE 2,068,136

PROCESS OF PREPARING EMULSIONS

Edwin F. Hulbert, Glenview, Ill.

Application August 20, 1934, Serial No. 740,631

1 Claim. (Cl. 252—6)

This invention relates to a process of and apparatus for preparing a stable emulsion and while capable of advantageous use with dispersions or emulsions generally, is particularly adapted, in its flexibility and nicety of control, to the preparation of emulsions intended for internal use. For example, it lends itself especially to the preparation of an emulsion of white mineral oil or other oil with agar-agar or other gum or gums. In general, the treatment which it affords the constituents of the emulsion is directed toward the unit particles rather than the mass and this applies not only to the fractionating of the oil but also to the dispersion of the protective colloid and to the completion of its hydration.

With the present invention, the subdividing or breaking up of the oil is carried on in such manner and to such extent as to form extremely minute oil globules of substantially uniform size, and at the same time the protective colloid is thoroughly and efficiently dispersed throughout the oil so as to enrobe or envelop each and every oil globule. This action is carried out at temperatures above the hydrating or setting temperature of the colloid.

After the physical structure of the phases of the emulsion has been perfected and they have been properly inter-related in the manner stated setting or complete hydration of the protective colloid is instantaneously effected in a novel manner. In fact, the mode of carrying out this final hydration is so controllable and flexible as to produce an emulsion of varying density or fluidity and of any desired unbalanced phases and yet one which remains stable under reasonable variations of atmospheric temperatures. It is entirely practical with this invention to over-balance the oil phase to the water phase to such extent that the oil in the finished emulsion is in excess, 85% by volume, and still obtain a semi-fluid product.

In addition to the advantage realized in the characteristics of the product, the invention also simplifies its production and lowers the cost thereof, accomplishes these objects largely by lessening the time required for the processing of the product and minimizing the handling thereof.

In carrying out the present invention, the agar or other gum or gums is dissolved or melted in boiling water, the water having been previously properly heated preferably by the direct injection of steam thereinto. Such solution is the emulsifying agent and it is next subjected to a powerful and violent agitating and cutting action characterized by a cascading of the particles of the mass back into the zone of initial agitation and cutting and also by a surging of the mass itself and by a whirling motion of the particles thereof. While maintained in this state the oil is added and is broken up and dispersed throughout the protective colloid. This operation is carried on until emulsification has been completed insofar as its physical structure is concerned but during such time the temperature of the mass has been maintained above hydrating or setting temperature, that is, above 95° F. when agar is the emulsifying agent.

The next step in the process involves the completion of the hydration of the agar or other colloid and this is brought about by instantaneously cooling the particles of the mass down well below 95° F. and at the same time precluding its solidification into a heavy jellied mass. Preferably, this last step is accomplished by spraying the mass under heavy pressures and in a finely divided state against an air stream whose temperature, humidity and volume are accurately controlled. Usually, it is desirable to form such sprays within a closed container wherein they are directed downwardly against an upwardly rising column of air. When so treated the mass deposits in the base of the receptacle and resembles, in consistency and appearance, cottage cheese but is capable, however, of easy resolution into a creamy, smooth semi-fluid upon further gentle agitation. It is practical by controlling the temperature, humidity and volume of the air against which the sprays are directed to control the density and final fluidity of the product and also to control the final proportion of the oil and water phases of the emulsion.

In the drawings, wherein is illustrated diagrammatically one type of apparatus for carrying out the process of the present invention:

Figure 1 is a view partly in vertical section and partly in side elevation showing one embodiment of the invention;

Figure 2 is a fragmentary view on an enlarged scale showing the manner of guiding or mounting the lower end of the agitator shaft and also the structure at the discharge outlet of the agitating tank;

Figure 3 is a view in horizontal section taken on line 3—3 of Figure 2 and looking in the direction of the arrows; and Figure 4 is a detail perspective view of the agitating or dispersion plate.

As shown in the drawings, the apparatus proposed for carrying out the process of the present invention may comprise generally an emulsifying tank designated generally at E, a hydrating chamber H, a high pressure pump designated at P for drawing the emulsion from the emulsifying chamber and spraying it through the spray nozzles S in the hydrating chamber and an air conditioner A for controlling the temperature, humidity and volume of air fed to the hydrating chamber H.

The emulsifying tank E consists, as shown, of a shell of metal having its lower portion 1 approximately in the form of a semi-sphere and having its upper portion or wall 2 sloping or inclining inwardly. A high speed electric motor 3 is appropriately mounted at the top of the emulsifying tank and its armature shaft is suitably connected to a hollow agitating shaft 4 which extends axially down through the tank E and has its lower end rotatably interfitted with a bearing 5 suitably built into the tank and operating to prevent undesirable whipping or deflection of the shaft 4. A dispersion plate 6 is suitably fixed to the lower end of the shaft 4 and is equipped with a plurality of ribs or blades 7, preferably in the form shown.

Access to the interior of the tank E may be had through a flanged opening 8 equipped with a removable closure 8' which may have a glass or transparent portion to serve also as a sight glass. Curved baffles 9 may also be provided in the upper portion of the tank.

Oil is fed into the emulsifying tank through the hollow shaft 4, it being supplied to the shaft 4 from an oil pump 10, the discharge of which connects by a pipe 11 with a gland 12. The shaft 4 is rotatable relative to the gland 12 and the gland and shaft have appropriate passages or openings to provide for the flow of the oil from the pipe 11 into the interior of the shaft 4. Adjacent the dispersion plate 6 the shaft is formed with downwardly directed nozzles 13 from which the oil emerges. In the very bottom of the tank E an opening is provided and is connected up with a discharge fitting 14 which is preferably equipped with a valve 15. The valve 15 is biased to closed position by a spring 16 and may be conveniently opened by a lever 17. A pipe line 18' having a valve 18 incorporated therein connects the discharge fitting 14 with the inlet of the high pressure pump P whereas the outlet or discharge of this pump P connects by a pipe line 19 with a manifold or header 20 equipped with the spray nozzles S.

The hydrating chamber H consists of a metal drum having a valve controlled discharge 21 in its bottom and a suitable stack 22 connected with its top.

The air conditioner A may be of any standard or well known construction and the air supplied therefrom is fed to a manifold 23 surrounding the inlet slots or openings 24 of the hydrating chamber.

In carrying out the method with the apparatus just described, a suitable quantity of water is placed in the emulsifying tank E and is brought up to the proper temperature, that is, to the boiling point by the direct application of steam supplied through the valve controlled steam line 25. Shredded agar alone or together with any other gum or gums is then added to the water and immediately dissolves. The motor 3 is started and rotates the shaft 4 at a high speed causing high speed rotation of the dispersion plate 6. This rapidly rotating dispersion plate together with its blade 7 causes the mass to rotate about the axis of the chamber. The mass under the influence of centrifugal force also flows out and up the curved and sloping walls of the tank and then cascades back onto the dispersion plate 6 in the manner generally indicated by the arrows in Figure 1. The motion in fact is the resultant of the bodily rotation and the outwardly and upwardly movement and the cascading, giving, in effect, a bodily moving corkscrewing action of the particles of the mass. There is also a surging of the mass in the lower portion of the emulsifying tank. The essential characteristic of the action is the violent agitation plus the cascading which means that the constituents of the emulsion are acted upon as unit particles, so to speak, rather than as a unit mass. Then too the shearing and cutting action of the blade 7 aids in the breaking up of the oil and in the dispersion of the protective colloid. It will be understood that while this action is going on a suitable quantity of oil is pumped in through the shaft 4 and emerges therefrom through the nozzles 13 at the source of the agitating action.

This operation is carried on until the physical structure of the emulsion has been perfected, that is to say, until the oil has been subdivided into extremely fine or minute globules of uniform size and the protective colloid has been so thoroughly dispersed throughout these globules as to effectively and completely enrobe or envelop them. During this time, however, the temperature of the mass has been maintained above the hydration temperature of the agar or other colloid, that is, above 95° in the case of an agar.

The next step in the process involves completion of the hydration of the agar or protective colloid while preventing its solidification into a jellied mass. This is accomplished in the present apparatus by opening the valves 15 and 18 and operating the pump P. The pump subjects the emulsion to high pressures and forces the same from the spray nozzles S as a finely divided spray or mist. In such form the emulsion encounters the upwardly moving column of conditioned air with the result that the temperature of the emulsion is suddenly dropped to below the hydrating temperature. It will be appreciated that the finely divided particles of the emulsion are suddenly individually surrounded by and suspended in the air so that there is an instantaneous cooling and setting of the colloid. Such finely divided particles fall to the bottom of the hydrating chamber where they mass up into a semisolid cake resembling the consistency and appearance of cottage cheese but being susceptible, upon further gentle agitation, of easy transformation into a creamy, smooth semi-fluid.

It is to be understood that agar, or agar-agar as used herein, is meant the commercially known dried mucilaginous extract from Gelidium corneum which has the ability to combine chemically with one hundred times its own weight of water to form a jell. The agar is used preferably in shredded form and easily dissolves or melts in boiling water and at such temperature goes into solution. However, it has little or no permanent emulsifying power until the temperature of the fluid approaches or falls below the hydration temperature of the agar about 95°, at which point the agar chemically combines with the water to form a more or less solid tough jell. It will be appreciated from the foregoing, that the present process takes advantage of this rapid transition from fluid to semi-solid occurring during a drop of the few degrees of temperature. The present invention, however, contemplates that the density and strength of the agar jell may be modified by the addition of other well known mucilaginous products to the agar solution while the latter is at a temperature above the hydration temperature of the agar.

It is also to be understood that the present invention in its broader aspects contemplates the hydration of the protective colloid by a cooling action which, although preferably accomplished in the manner set forth, may also be accomplished in other ways. Furthermore, the invention is not restricted to the preparation of an emulsion constituted of the particular substances named. The process lends itself to the preparations of emulsions of various formulae.

In general, the method and apparatus disclosed are to be taken as illustrative of the invention and various changes or modifications, which will be apparent to those skilled in the art, may be resorted to without departing from the spirit of the invention or the scope of the subjoined claim.

The invention claimed is:

The hereindescribed process of preparing an emulsion of mineral oil and an aqueous solution of agar-agar which consists in breaking up and dispersing the constituents of the emulsion while maintaining the temperature of the mass above the hydrating temperature of the agar and until the desired physical structure of the emulsion has been accomplished, and then spraying the mass within a confined chamber against a stream of air properly controlled as to volume, temperature and humidity to quickly reduce the temperature of the particles of the mass to a point below the hydrating temperature of the agar whereby to obtain a stable emulsion of a predetermined fluidity and phase proportion.

EDWIN F. HULBERT.